June 2, 1970  E. W. HINES ET AL  3,515,409

STABILIZING DEVICE FOR ARTICULATED VEHICLES

Filed Oct. 2, 1967  6 Sheets-Sheet 1

INVENTORS
EUGENE W. HINES
NORMAN F. LAPINE, SR.

BY Hugh A Kirk

ATTORNEY

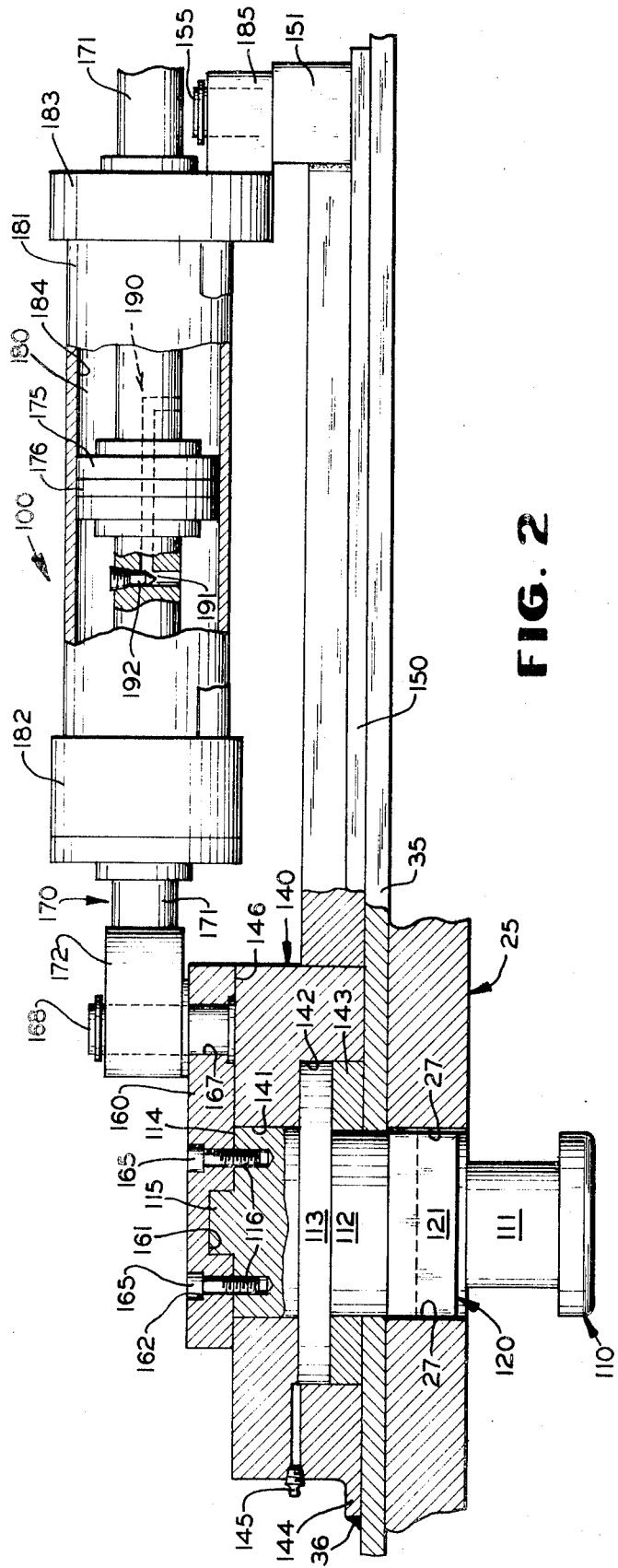

INVENTORS
EUGENE W. HINES
NORMAN F. LAPINE, SR.

BY

*Hugh A. Kirk*

ATTORNEY

INVENTORS
EUGENE W. HINES
NORMAN F. LAPINE, SR.
BY

*Hugh A. Kirk*

ATTORNEY

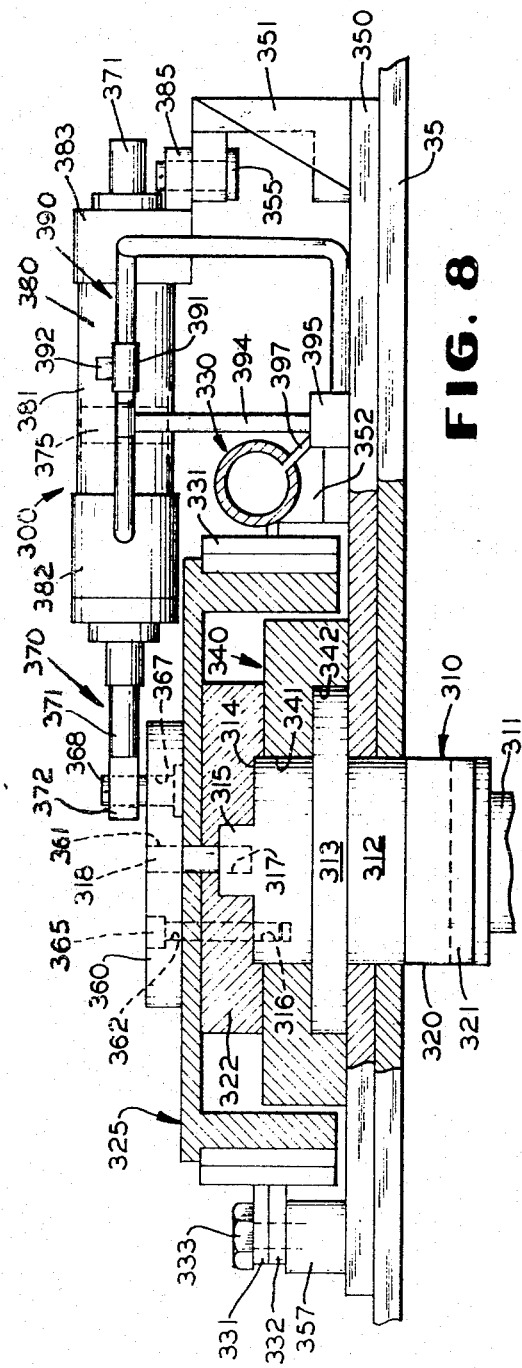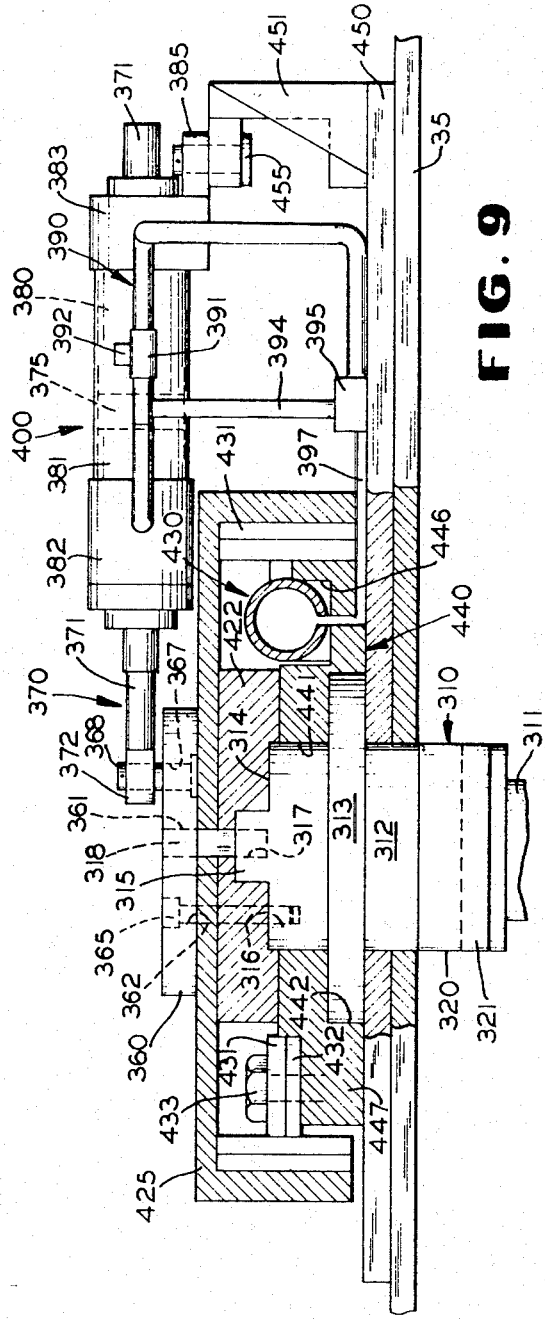

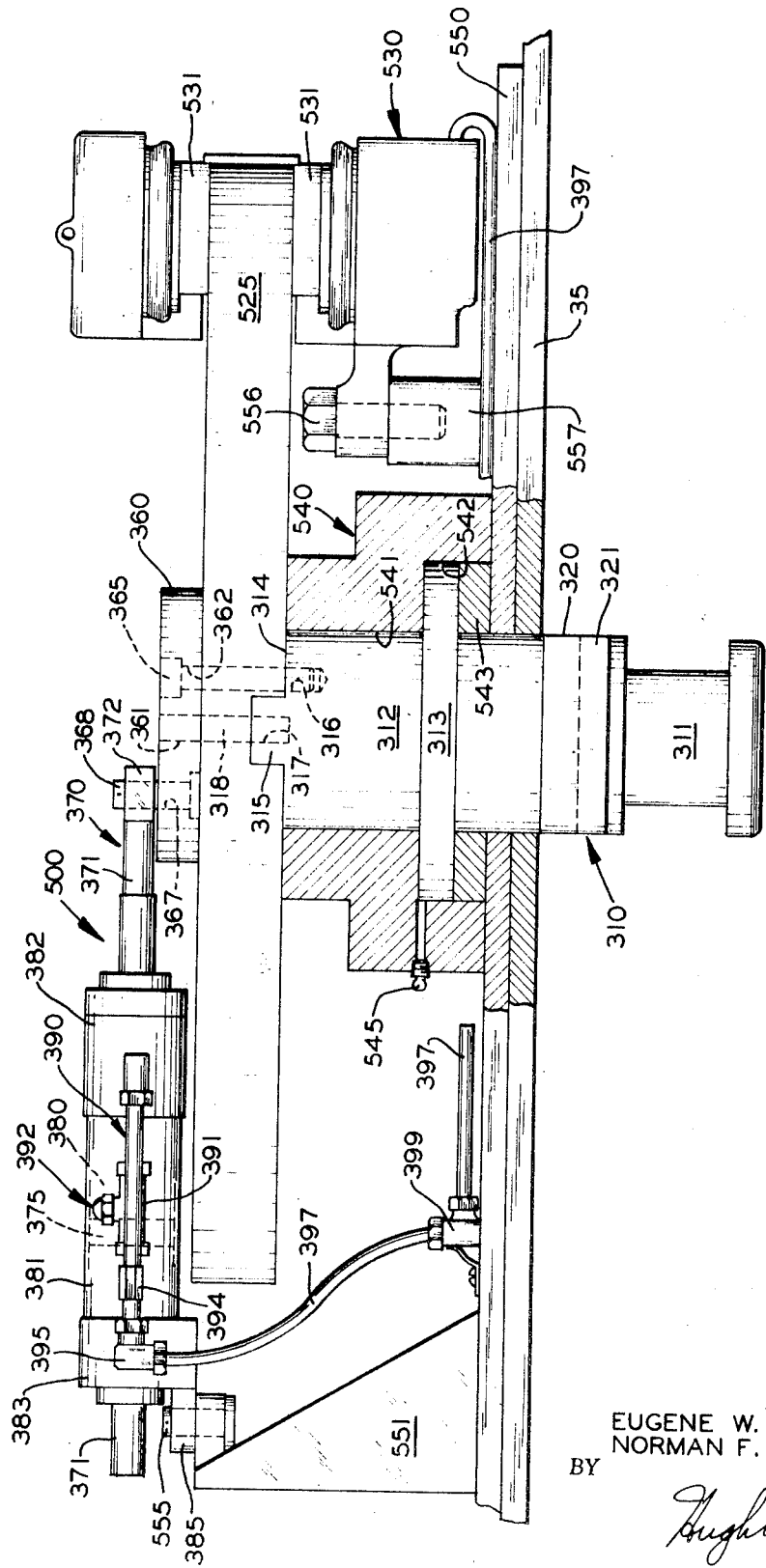

United States Patent Office 3,515,409
Patented June 2, 1970

3,515,409
STABILIZING DEVICE FOR ARTICULATED
VEHICLES
Eugene W. Hines, Saline, Mich., and Norman F. Lapine,
Sr., Toledo, Ohio, assignors to The Mather Company,
Sylvania, Ohio, a corporation of Ohio
Filed Oct. 2, 1967, Ser. No. 672,271
Int. Cl. B62d 53/08
U.S. Cl. 280—432                                23 Claims

ABSTRACT OF THE DISCLOSURE

An automatically variable fluid damping device connected to the vertical pivot connection between articulate vehicles to improve road stability including suppressing swaying and jackknifing, comprising an arm on the pivot connected to one of the vehicles to rotate the pivot with that vehicle as the vehicles articulate, and a crank or cam means also attached to the pivot which variably reciprocates a piston in an annular chamber fixed to the other vehicle, which chamber is filled with a damping fluid for variably restricting the rotation of the pivot with respect to the other vehicle. Between opposite sides of the piston head in the chamber is a passageway or duct means with a rigidly adjustably restricting continuously open orifice for controlling the rate of flow of fluid from one side of the piston head to the other. This adjustably restricted duct means may be connected to a a signalling means and/or to a hydraulically operated brake means for further restricting the relative articulated motion between the vehicles.

BACKGROUND OF INVENTION

A lever arm which engages the slot in the fifth wheel of articulated vehicles for operating the kingpin, which operation is continuously restricted by a hydraulic piston action is known from the Black U.S. Pat. No. 2,692,146 issued Oct. 19, 1954. This action is effected through the reciprocations of a rack on the piston meshing with a pinion gear on the kingpin.

Thus, previous anti-jackknifing devices for articulated vehicles were heavy, expensive, hard to install, required special activating or engaging means, required considerable alterations to the vehicles, and/or were not fail safe. Furthermore, many of these previous devices positively locked the units together, not permitting the driver freedom or time to correct or drive out of a jackknifing action when it was sensed. Also, many such previous devices were controlled by the driver, either together with the brakes for the wheels of the vehicle, or by a separate lever means, and if they were not timely operated, they would have little or no effect. Some previously known devices require training on the part of the operator or driver of the vehicle in order to effect their proper operation, such as that for the device disclosed in the Hope et al. U.S. Pat. No. 3,328,051.

Accordingly so far, no automatically variable, simple, effective, efficient, automatic, and economic device for improved road stability including suppressing swaying and jackknifing has been commercially placed on the market that overcomes all of the above mentioned problems.

SUMMARY OF THE INVENTION

Generally speaking, the stabilizing device for articulated vehicles according to this invention comprises a variable reciprocating hydraulic damping mechanism attached to the pivotal connection between such vehicles. This pivotal connection may comprise a kingpin and fifth wheel connection as between a tractor and a trailer. Such a fifth wheel is usually on the tractor vehicle and comprises a substantially horizontal plate with a rearwardly open slot therein for releasably engaging the kingpin vertically depending from a wear plate on the trailer vehicle or a dolly and a trailer. The application of the present damping device comprises replacing only the normally fixed kingpin, by a rotatable kingpin having a lever arm formed to engage a part of a trailer, for example, to fit as snugly as possible in the slightly different width and shaped slots in the fifth wheels of different tractors. This lever arm may have a thicker or offset end portion to insure engagement in the tongue or slot, if the tongue or fifth wheel plate tilts relative to the axis of the kingpin, such as when the vehicles pass over a bump, crest, or depression in the road. This lever arm also may even include resilient means for permitting change of its width to fit different width tongues or slots in fifth wheels. Thus, this lever arm causes the kingpin to oscillate with one of the vehicles relative to the other. This kingpin is mounted in a wear resistant bearing on one of the vehicles, and is provided with an articulated eccentric means such as a crank or a cam which oscillates with the kingpin and operates a reciprocating damping means. This reciprocating means includes a damped piston, which reciprocates at a rate that differs from the rate of the angular motions of the kingpin. Thus, when the tractor and trailer are in substantial alignment, the amount of reciprocations may be predetermined to be greater (or lesser) than the same angular movements between the tractor and trailer when they are substantially at right angles to each other or in a jackknifing position, and/or vice versa. These variations are accomplished by the mounting and the location of the oscillation converting or reciprocating means with respect to the crank and/or the shape of the cam means. The piston of this converting means reciprocates in an annular shaped fluid filled chamber or cylinder mounted on the vehicle with the oscillating kingpin, such as on the upper side of the wear plate of a trailer. Thus, as this piston reciprocates with the oscillations of the kingpin, these reciprocations are damped by the flow of the fluid in the chamber from one side of the piston head to the other through a passageway or duct means which may be provided in or around the housing of the cylinder or through the piston itself. This duct means is provided with a manually preset or rigidly adjustable orifice means to restrict this flow and shear of the fluid through it, but not to block it completely so as to lock or prevent any oscillation when a relatively fast rate of turning or angularity occurs between the vehicles as during jackknifing. Accordingly, the predetermined restricted orifice means automatically dampens the oscillations sufficiently to suppress swaying and jackknifing, and also permits sensing of the start of a jackknifing action, and permits time enough for the operator of the pulling vehicle or tractor to take corrective action to prevent complete jackknifing or unwanted swaying.

The orifice in this duct means is usually preset for the particular articulated vehicle and its usual load, and is not changeable by the drive or from the cab, so that the operation of this device is completely automatic. However, the orifice may be so located that it can be readjusted by a mechanic when necessary, without the removal of the device from the vehicle.

If desired, the duct means for the damping fluid may be bypassed for operating an audible and/or visual signalling device for the operator of the vehicle to further warn him of impending jackknifing or uncontrollable harmonic swaying.

Furthermore, the adjustable orifice duct means may be bypassed for operating a hydraulic brake which brakes a drum or disk that may be mounted on the kingpin, and thereby further restricts or frictionally brakes the angular movement between the vehicles when the rate and/or amount of angularity increases beyond a predetermined or preset amount.

Objects and advantages

Accordingly it is an object of this invention to produce a stabilizing device for articulated vehicles which increases its damping action the faster the change in angle between the vehicles occurs, and thus suppresses jackknifing of the vehicles as well as continuously restricts the swaying between the vehicles to provide better road stability and a more comfortable ride for the vehicles, which swaying may be caused by road conditions, equipment and tire failure, wind and passing vehicles. This in turn allows the driver to sense the start of jackknifing action in sufficient time to take corrective action, and prevent accidents, and greatly increases public safety.

Another object is to produce such a stabilizing device for articulated vehicles without affecting or disturbing the normal operation or turning of the vehicles, or without re-distribution of the load carried by the vehicles. Furthermore, it allows the usual braking and control systems to be more effective and thereby enhance their operation and the safety of the vehicle.

Other objects are to provide such a stabilizing device which is automatically variable, adjustable, easily installed, light in weight, simple, economic, efficient, effective, self-contained, quick releasing, fail safe has few parts, low maintenance, and universal application, requires no external piping or electrical circuits, is not tied in with any other system of the vehicle, operates on curves as well as straight roads, is sealed from dirt and weather so as to be unaffected thereby, is tamperproof and foolproof, takes up no usable space in the vehicle for the load, and may include stopping means which restricts the angularity of the two vehicles, such as in a tractor-trailer so that the trailer will not go beyond about 104° from its aligned position so as not to materially damage the cab of the tractor vehicle.

BRIEF DESCRIPTION OF THE VIEWS

The above mentioned and other features, objects, and advantages, and the manner of attaining them are described more specifically below by reference to embodiments of this invention shown in the accompanying drawings, wherein:

FIG. 2 is an enlarged vertical sectional view along line 2—2 of the stabilizing device shown in FIG. 1 showing the lever arm, crank, and piston associated with the kingpin, and parts of the adjacent wear plate and fifth wheel of the articulated vehicles;

FIG. 4 is an enlarged plan view of a modified kingpin lever arm shown in FIGS. 2 and 3 with a resilient insert therein;

FIG. 5 is a sectional view taken in the direction of the arrows 5—5 of FIG. 4 showing the resilient insert in the center of the lever arm;

Figure 6:
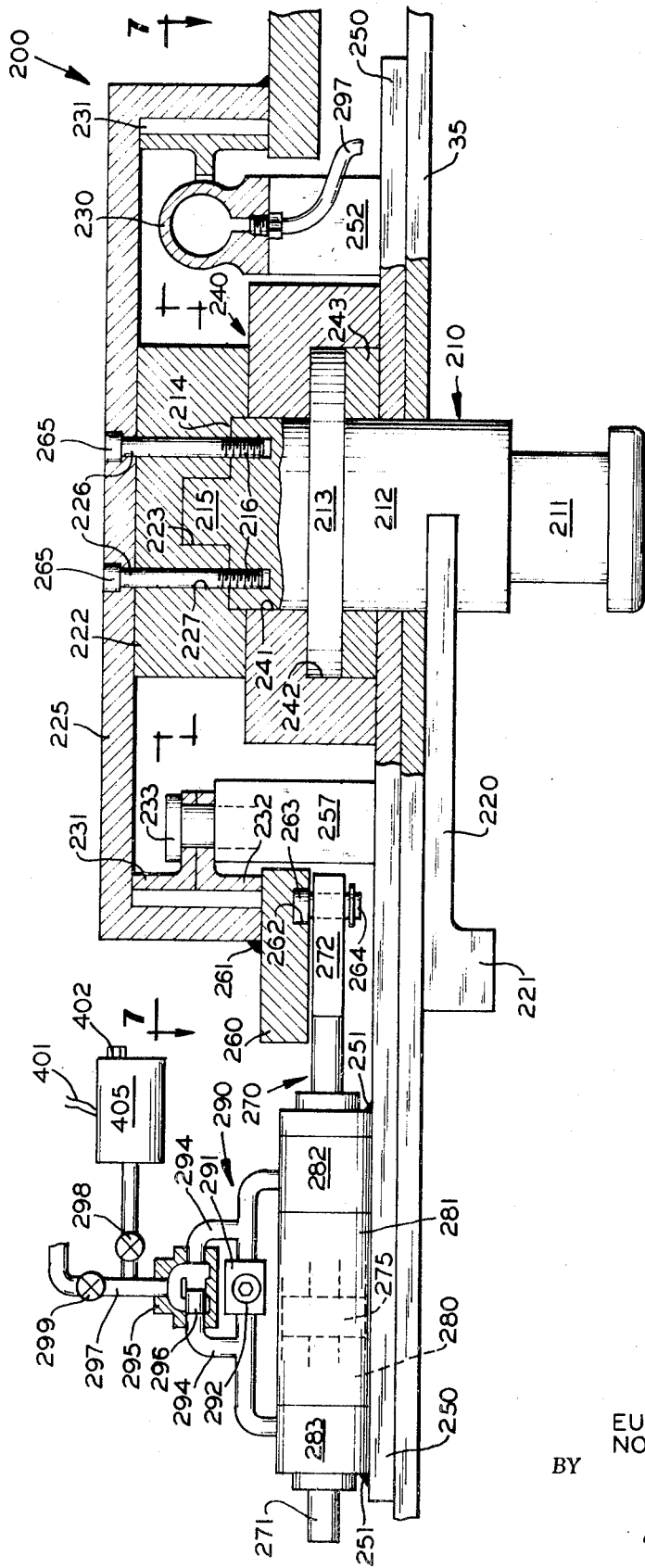
Figure 7:
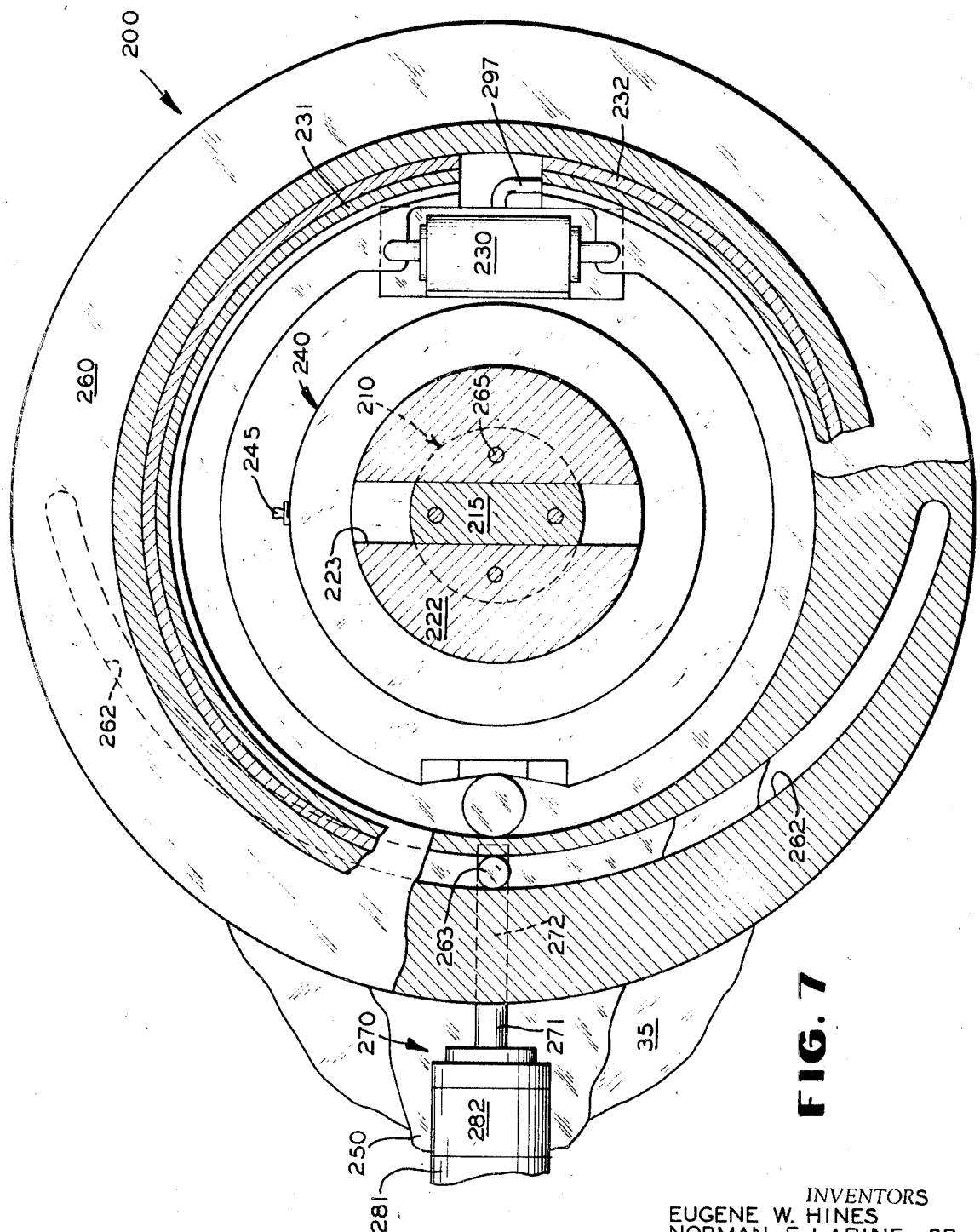

FIG. 6 is an enlarged vertical sectional view similar to FIG. 2 but of another embodiment of the device according to this invention, showing a cam means for operating the piston, and including a brake drum mounted on the top of the kingpin and branch duct means connected to the orifice restricted duct means for a signalling device and/or for operating brake shoes against the outside of the brake drum;

FIG. 7 is a sectional view along line 7—7 of the embodiment shown in FIG. 6 with parts broken away and showing the contour of a cam means therefor;

FIG. 8 is a reduced vertical sectional view of a still further embodiment of the device similar to that shown in FIG. 2, and including a brake drum mounted on the top of the kingpin connected to the orifice restricted duct means for operating brake shoes against the outside of the brake drum similar to FIG. 6;

FIG. 9 is a reduced vertical sectional view of an embodiment similar to that shown in FIG. 8 but with the brake shoes inside of the brake drum mounted on the kingpin; and FIG. 10 is a reduced vertical sectional view of another embodiment similar to that shown in FIGS. 8 and 9 but with a disk brake mounted on the top of the kingpin which is restricted by fluid operated calipers.

Figure 1:
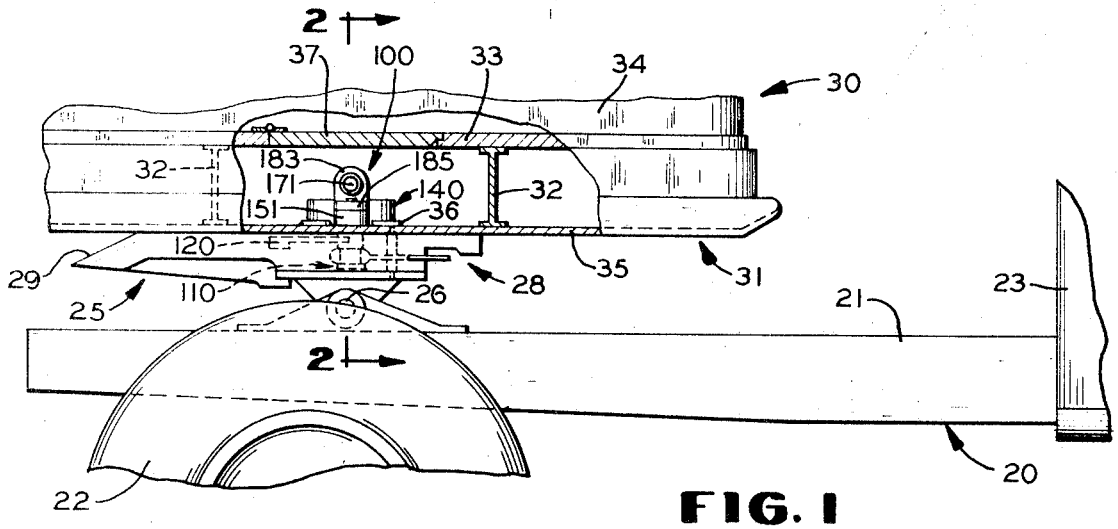
FIG. 1 is a side elevation of the fifth wheel and kingpin connection between a tractor and trailer with the major portions of the tractor and trailer being broken away, and showing one embodiment of the variable automatic stabilizing device of this invention attached to the kingpin thereof.

DETAILED DESCRIPTIONS OF THE PREFERRED EMBODIMENTS (A) The articulated vehicle (FIG. 1)

Referring primarily to FIG. 1, there is shown a portion of a tractor 20 and trailer 30 of a pair of articulated vehicles. The parts of the tractor disclosed comprise the frame 21, a portion of a rear wheel 22 mounted on the frame, and a portion of a cab 23 in which the driver of the tractor is usually located. The fifth wheel assembly 25 is shown mounted on a horizontal transverse pivotal axle 26 so as to be easily tiltable to fit flat against the wear plate 35 of the trailer 30. The fifth wheel 25 is provided with a rearwardly extending substantially V-shaped notch (see FIGS. 2 and 3) with substantially parallel sides at its apex section forming a notch or slot 27, into which the kingpin 110, 210 or 310 may slide.

Each of the kingpins 110, 210 and 310 shown in FIGS. 2 (or 4), 6, or 8 (or 9 or 10), respectively, is provided at its lower end with the same type of grooved portion 111, 211, or 311, for engagement with a locking device 28 on the tractor 20 to prevent the kingpin 110, 210 or 310 from sliding out of the V-notch and slot 27 when the tractor 20 is to be connected to the trailer 30.

The trailer 30 as shown in FIG. 1 comprises a frame 31 with cross members 32 which support a platform 33 which may be covered by a body section 34. Below the cross members 32 is provided the wear plate 35 which rests against the top of the fifth wheel 25 and is lubricated to permit articulated motion around the axis of the kingpins 110, 210, or 310.

Mounted on the vertical pivot or kingpins 110, 210, and 310 is the stabilizing device 100, 200, 300, 400, or 500 of this invention, each of which comprises a lever arm 120, 220, 320 (or 130—see FIGS. 4 and 5) attached to its kingpin. The bearing housing 140, 240, 340, 440, or 540 in which the kingpin is journalled may be affixed to the opposite side of the wear plate 35 such as by means of bolts and/or welds 36 directly to the lower outer flange portions or base plate of the bearing housing 140, 240, 340, 440, or 540. Thus, the tractor-trailer stabilizing device 100, 200, 300, 400, or 500 of this invention is so constructed to fit between two parallel cross members 32 of the trailer 30 and beneath the platform 33, or between it and the wear plate 35, thus taking up no usable space in the trailer. If desired, the platform 33 or floor of the trailer 30 may be provided with a removable panel or hatch 37 for easy access to the stabilizing device 100, 200, 300, 400, or 500, such as for installation, removal, and/or filling with hydraulic fluid, adjustment of the orifice in the duct means therein, and/or the like.

(B) Automatically variable stabilizing devices (FIGS. 2–5, 6–7, 8, 9, and 10)

For the purposes of clarity, the same parts in all of the figures will have the same reference characters, and similar parts or parts with similar functions in the five different embodiments will in many cases have similar reference characters, but with correspondingly different hundredths digits. For example, the embodiments shown in FIGS. 2 through 5 will have reference characters of the 100 series, FIGS. 6 and 7 of the 200 series, FIG. 8 of the 300 series, FIG. 9 of the 400 series, and FIG. 10 of the 500 series.

(B–1) Lever arm on pivot pin

Referring now primarily to FIGS. 2 through 5, the lever arm 120, 220, 320 or 130 is fixedly attached to the vertical pivot or kingpin 110 (or 210, or 310) preferably above the groove 111, 211, or 311, which attachment may be formed integrally with the kingpin 110, 210, or 310, or may be welded or bolted thereto, as desired.

The outer end of the lever arm 120 (or 130) 220, or 320 is preferably provided with a downwardly extending offset portion 121, 221 or 321 to insure its engagement into the sides of the slot 27 in the fifth wheel 25 regardless of its tilt or the location of the bevel 29 thereon, such as shown in FIG. 1.

Figure 3:
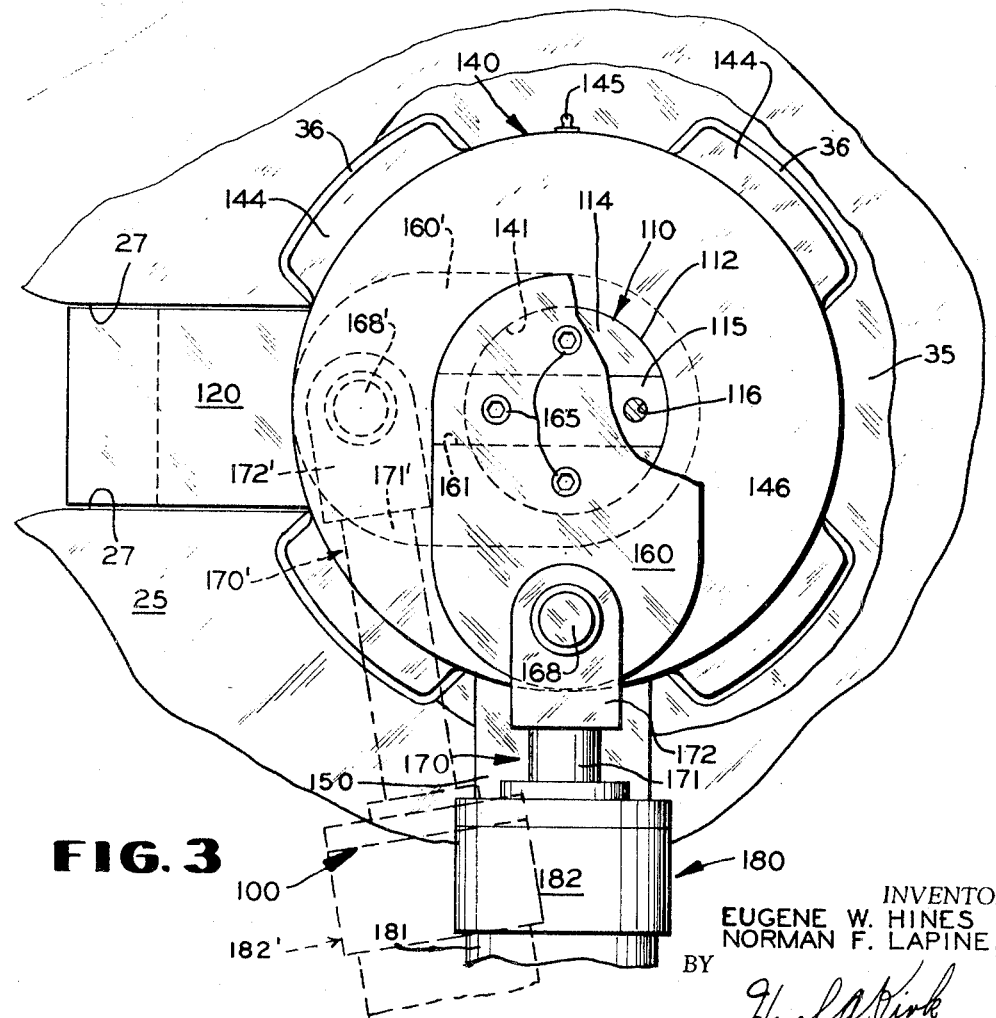
FIG. 3 is a plan view of the device shown in FIG. 2 with parts broken away, and showing another position of the crank and piston in dotted lines.

If desired, the lever arm 120, 220 or 320 may be provided with a central slot or notch 132 as shown for the lever arm 130 in FIGS. 4 and 5 with a pair of offset ends 131 and sides substantially parallel to the sides 133, which notch may be grooved at 135 (see FIG. 5) to retain a snubber means such as resilient plastic insert 136 of hard or synthetic rubber or a mechanical resilient snubber which permits slight resiliency between the sides 133 to fit more snugly against the relatively parallel sides of the apex portion of the notch 27 as shown in FIG. 3. The end of the notch 132 may be rounded at 137 as shown in FIG. 4 to permit more flexibility between these sides. Thus the lever arm 130 may fit snugly into the notch 27 of the fifth wheel 25 regardless of the variations in these notches between different vehicles, thereby making the device of this invention substantially universal in application.

(B–2) The base and bearing means (FIGS. 2–3, 6, 8, 9 and 10)

The upper end of each of the pivots or kingpins 110, 210, and 310 are provided with extensions 112, 212, and 312 which preferably are provided with outwardly extending bearing flanges 113, 213 and 313 of greater diameter than these extensions. The upper ends or tops 114, 214 and 314 of the kingpins 110, 210 and 310 may also be provided with diametrically extending rectangular ridges 115, 215 and 315 which may be employed as keys for operating the oscillation converting means to be described in the next section B–3 below. Also the top surfaces of the pivots or kingpins may be provided with one or more tapped holes 116, 216, and 316 parallel to the axis and offset therefrom for bolts 165, 265, and 365 for anchoring this converting means.

Extending over and around the bearing flanges 113, 213, and 313 of the kingpins 110, 210 and 310 are provided the bearing housings or bases 140, 240, 340, 440 and 540 which may comprise central apertures 141, 241, 341, 441, and 541 for journalling the upper portion of the extensions 112, 212 and 312, and larger diameter shoulder portions 142, 242, 342, 442 and 542 for journalling the journal flanges 113, 213, and 313, which flanges may be held against these shoulders by their widths resting on base plates 350 or 450 as shown in FIGS. 8 and 9 or by split or half-annular bearing rings 143, 243 and 543 as shown in FIGS. 2, 6 and 10 respectively.

These bearing housings 140, 240, 340, 440, and 540 may be provided with outwardly extending flanged portions 144 as shown in FIGS. 2 and 3 which may be welded directly as at 36 to the opposite or upper side of the wear plate 35 and/or to supporting base plates 150, 250, 350, 450 and, 550, which in turn may be attached by bolts and/or welding to the opposite or upper side of the wear plates 35. These base plates 150, 250, 350, 450, and 550 then in turn may also be anchored by bolts and/or welding to the bearing housing 140, 240, 340, 440, and 540, which base plates are employed for mounting other parts of the converting means so that the damping devices of this invention may be installed as a unit. However, for the installation of these devices as units, a slot may be cut into the wear plate 35 for inserting the lever arms 120 (or 130), 220, and 320 therethrough, and then welding back the piece cut out.

The outer surfaces of the bearing flanges 113, 213, and 313 and the extensions 112, 212, and 312 may be hardened for providing durable wearing surfaces that contact similarly hardened surfaces of apertures 141, 241, 341, 441, and 541 and chambers 142, 242, 442, and 542, as well as the upper surfaces of the split ring plates 143, 243, and 543. However, in place of these bearing surfaces, other suitable durable bearings may be used which will withstand the tremendous forces that are applied to the connecting pivots or kingpins between the vehicles to which the device of this invention is adapted. These bearing surfaces between the bearing housings 140, 240, 340, 440, and 540, and the kingpins 110, 210, and 310 may be lubricated through grease fittings 145, 245, and 545 as shown, for example, in FIGS. 2–3, 7 and 10, respectively.

(B–3) The oscillation converting means (a) *Crank and pivoted piston means (FIGS. 2, 3, 8, 9 and 10)*.—In FIGS. 2 and 3 the crank arm 160 may be provided with a transverse notch 161 which fits the key type projection 115 on the upper end of the pivot or kingpin 110 so as to key its angular movements with that of the kingpin 110. Also there are provided a plurality of countersunk shouldered holes 162 for the insertion of bolts 165 which may thread into the threaded apertures 116 in the extension 112 to hold the crank arm 160 onto the pivot or kingpin 110 and into the key 115 thereof. The top or upper surface 114 of the kingpin 110 preferably projects above the upper surface 146 of the bearing housing 140 so as to provide free angular motion for the crank arm 160 thereover.

Offset from the axis of the pivot or kingpin 110 and slot 161 in the crank arm 160, there is provided a pivot aperture 167 in which is journalled a pivot pin 168 for the end of the piston rod of the piston means 170 to be described below.

Referring to the embodiments of this invention shown in FIGS. 8, 9 and 10 diametrical key projections 315 on the extensions 312 of the kingpins 310 are shown to be provided with rectangular slots 317 into which may be fitted irregular or rectangular keys 318. These keys 318 extend up through similar rectangular slots provided in the brake drums 325, 425 or disk 525 (to be described later in section B–6), into similarly shaped slots 361 in the crank disks or arms 360. These crank members 360 may be provided with countersunk shouldered holes 362 for bolts 365 that may extend down through holes into tapped holes 316 in the extensions 312 for holding these crank members 360 in place together with the brake means clamped therebetween. Parallel to the axis of the kingpins 310 and the keys 318, and offset or eccentric thereto may be provided aperture 367 into which are journalled the crank pivot pins 368 which may be connected to the end of the piston rods of the oscillation converting or piston means 370 of this invention.

In FIGS. 2, 3, 8, 9 and 10, the reciprocating piston means 170 and 370 comprise reciprocating piston rods 171 and 371 which are provided with connections 172 and 372 at one of their ends journalled to the pivot pins 168 and 368. These piston rods 171 and 371 extend completely through annular chambers 180 and 380 formed by cylinders 181 and 381 so as to provide equal piston head areas on both sides of their piston heads 175 and 375. Opposite ends 182, 382 and 183, 383 of these cylinders 181 and 381, respectively, have fluid-tight or gasketed apertures for the piston rods 171 and 371 which slide therethrough. Intermediate the heads 182 and 183 or 382 and 383 and inside the annular chambers 180 or 380 of the cylinders 181 or 391 reciprocate the piston heads 175 or 375 fixed to the piston rods 171 or 371, which heads divide the annular chambers 180 and 380 in two portions. The piston heads 175 and 375 may be gasketed against the inside cylindrical surfaces, such as surface 184 of the cylinder 181 by means of a gasket 176 as shown in FIG. 2.

The cylinder head 182 or 382 floats and is supported by the cylinder 181 or 381 and its piston rod 171 or 371, while the cylinder head 183 or 383 is provided with a projection 185 or 385 for journalling a pivot pin 155 or 355 mounted on bracket 151 of the base 150; or brackets 351, 451, or 551 for pivot pins 355, 455, or 555 in the embodiments shown in FIGS. 8, 9, and 10, respectively.

Attention is particularly called to FIG. 3 wherein the full line position of the piston means 170 is shown in one of the piston means two extreme positions, while its normal position is shown in dotted lines with primed reference characters 170', 171', 172', together with the crank 160', 168' which is at about 90° from either of its two extreme positions. Since the reciprocating movement of the piston 171 corresponds to the cosine of the angle of the lever 160, it varies with the same angular changes in the crank 160, so that the closer the crank 160 is to alignment with the piston rod 171, the less movement the piston will have for the same angular movement of the pivot 110 or crank 160, while its greater movement occurs when it is at about 90° to the axis of the piston rod 171. Thus, according to this disclosure, the most damping by the piston means 170 will occur in departure from the normal position shown in dotted lines in FIG. 3, and the least damping will occur in the full line position, or 180° opposite from the dotted line position.

This arrangement reduces materially the swaying of the trailer 30 when the oscillations between the vehicles are at relatively small angles from their alignment, and reduces locking of the angular position between the vehicles when large angles are approached quickly as usually occurs during jackknifing. On the other hand, if desired, the connection between the piston means and the crank may be at another angle, such as 90° to that shown in FIG. 3 in which the reverse of these damping effects will occur.

These variable reciprocating motions produced by a crank and a piston means or cylinder also occur for the devices 300, 400 and 500 shown in FIGS. 8, 9, and 10, respectively, which are similarly connected.

(B-3(b)) Cam and fixed piston means (FIGS. 6 and 7)

Instead of employing the crank for varying the linear reciprocating motion of a piston at a different rate or over different distances than the angular rate or movement of the pivot or kingpin, there is shown in the embodiment in FIGS. 6 and 7, a cam means 260 which may be mounted such as by welding 261 to the rim of a brake drum 225 or other support keyed to the top of the kingpin 210. This may be accomplished by means of a block 222 having a key type slot 223 therein cooperating with the ridge 215 on the top of the kingpin 210, and by bolts 265 that extend through countersunk apertures 226 and holes 227 in the brake drum 225 and block 222, respectively, into the threaded apertures 216 provided in the extension 212 of the kingpin 210. The ring cam 260 may be provided with a cam shaped groove 262 (see also FIG. 7) which may have a configuration of varying radii from its axis of rotation. A cam follower 263, such as a roller mounted on a pivot 264 is mounted at the outer end 272 of the piston rod 271 of the piston means 270.

Thus, as the kingpin 210, drum 225, and cam 260 oscillate, the cam follower 263 moving in the arcuate or cam track or slot 262 causes the piston rod 271 to reciprocate in and out of the fixed cylindrical chamber 280 of cylinder 281 at a different rate and amount than the angular rate and movement of the oscillations of the pivot or kingpin 210. This cylinder 281 may have its heads 282 and 283 bolted or welded 251 to the plate 250, and the piston rod 271 extending through both its heads, similarly to that for piston means 170 described above. Thus, the variable reciprocating motion of the piston means 270 with cam 260 can be similar to that or a crank, or it may be much more varied and even irregular, depending upon the shape of the cam or cam track 262, so that the damping of the piston means 270 may vary at different predetermined angles between the vehicles. Accordingly, this embodiment provides a wide variety of different conversions for the angular motions of the pivot or kingpins, and the flexibility of this embodiment of the invention is much greater that that of the crank and pivoted piston described above. For example, the cam track may be regular, straight, stepped, undulating, curved, etc., or a combination of one or more of such shapes.

Also, if desired, the cam track 262 may include stops at its ends to positively restrict angular movements greater than about 104° in each direction, to restrict one articulated vehicle from crushing the other when greater than 90° angularity between them occurs.

(B-4) Adjustable orifice means (FIGS. 2 and 6)

Referring to FIG. 2, there is shown a duct means 190 through the piston rod 171, which duct extends between opposite sides of the piston head 175, so that when the cylinder or annular chamber 180 is filled completely with fluid, it will restrict the reciprocations of the piston means 170. This fluid usually is hydraulic oil which has a high viscosity index (V.I.) and may include a mineral, organic or silicone oil, and may have a predetermined viscosity.

According to this invention, this duct means 190 is provided with a continuously open orifice 191 which may be fixedly set and adjusted by means of a threaded needle-type valve 192, which may be self-locking or locked by a locking screw so as to be substantially tamper-proof. This fixed orifice 191 is so set by the valve means 192 not only to prevent locking of the damping device of this invention, but also to restrain the angular movement of the pivot pin 110 and particularly the faster angular or swaying movements and jackknifing actions, so as to produce a sensation to the driver of the articulated vehicles and to give the driver ample time to take corrective action and prevent accidents.

If desired, the duct means 190 and its adjustable orifice may be provided in the cylinder head 175, instead of in the cylinder rod 171 as shown in FIG. 2, without departing from the scope of this invention.

Referring to FIGS. 6 and 8, 9, and 10 there are shown duct means 290 and 390 outside of the cylinders 281 and 381, connected between and to their cylinder heads 282, 283 and 382, 383, which duct means are provided with valves 291 and 391 having adjustable means 292 and 392 to preset orifices, which adjustable means may be locked in position or keyed so as to prevent tampering by unauthorized persons. These duct means 290 and 390 also, and similarly to duct means 190, permit the fluid in the annular chambers 280 and 380 divided by the piston heads 275 and 375 to pass from one side of the piston head to the other, and by their preset continuously open orifice valves 291 and 391 to restrict the flow of this fluid to produce a damping of the oscillations of the pivot or kingpins 210 and 310.

It is to be understood, however, that the duct means 290 or 390 shown in FIGS. 6 through 10 may be replaced by the duct means 190 shown in FIG. 2, and vice versa, without departing from the scope of this invention.

Also, if desired, the housing or cylinders 181, 281 or 381 may be provided with this duct means and adjustable orifice without the outside piping as shown in FIGS. 6 through 10.

(B–5) With signalling means (FIG. 6)

If desired, two parallel branch conductors 294 as shown in FIG. 6 or 394 as shown in FIGS. 8, 9, and 10 may be connected to opposite sides of the adjustable orifice valves 291 or 391, which two branch ducts 294, 394 may be connected to opposite ends of a shuttle type valve 295 or 395 so as to pass only positive pressure from the chamber 280 or 380 regardless of in which end portion of the chamber it occurs. Such a shuttle type valve 295 or 395 is shown in section in FIG. 6 to show its pressure operated floating shuttle 396.

The outlet duct 297 or 397 from this shuttle valve 295 or 395 may be connected through a valved duct 298 as shown in FIG. 2 to operate a signalling device, such as to a pressure responsive switch 405 to which maybe connected electrical wires 401 and may have a manual regulator means 402. The electrical wires 401 may be connected to either audible or visual or both types of signals in the cab 23 of the articulated vehicles so as to signal the operator of the vehicle of any rapid increase in pressure such as a start of a fast oscillation. Thus, this signalling means 405 is a further means for indicating the commencement of jackknifing or undesirable swaying action so the operator will be further alerted in time to take the necessary precautionary steps to prevent an accident.

(B–6) With brake means (FIGS. 6–7, 8, 9, and 10)

Furthermore if desired, the duct 297 or 397 from the shuttle valve 295 or 395 may be connected through a check valve 299 or 399 and thence to hydraulic brake cylinder 230, 330, 430 or 530. The cylinder 230 may be mounted on pedestal 252 of base plate 250; the cylinder 330 may be mounted on a pedestal 352 of base plate 350; the cylinder 430 may be mounted on projection bracket 446 of the bearing housing 440 as shown in FIG. 9; or the caliper operating cylinder 530 shown in FIG. 10 may be mounted by bolt 556 to pedestal 557 mounted on base plate 550.

In FIGS. 6 and 7 the double acting hydraulic brake cylinder 230 presses the two brake shoes 231 and 232 against the inside of the brake drum 225 to further restrict and dampen the oscillatory motions of the kingpin 210. These two brake shoes 231 and 232 may be pivoted on pivot 233 mounted on a pedestal 257 which may be anchored to the plate 250.

In FIG. 8 there is shown a brake drum 325 which is mounted on a block 322 which is keyed together with the cam disk 360 by means of the bolts 365 to the top of the kingpin 310. In this embodiment the brake shoes 331 and 332 also engage the outside of the drum 325 and are pivoted on a pivot 333 mounted on a pedestal 357 connected to the base plate 350 on the opposite side of the drum from the brake cylinder 330. However, this embodiment differs from that of FIGS. 6 and 7 by employing a different type of piston means 370.

In FIG. 9 the brake drum 425 is spaced by the block 422 and bolted to the upper end of the kingpin 310 similarly to that shown in FIG. 8, but instead, the brake shoes 431 and 432 operate inside the brake drum 425. These shoes 431 and 432 may be pivoted by bolt 433 fastened to an extension 447 of the housing 40, which in turn is connected or welded to the base plate 450. This brake drum 425 is connected to the kingpin 310 through spacer 422 and together with the crank plate 360 by means of the key 318 and bolts 365.

In FIG. 10 there is disclosed a disk 525 of a disk brake mechanism, which disk 525 is keyed to the top end of the kingpin 310 together with the crank means 360 by means of a plurality of bolts 365. This disk 525 is clamped between the jaws 531 of the hydraulically operated caliper cylinder 530 connected to the branch duct 397 from the shuttle valve 395, as are the other brake cylinders shown in the previously described embodiments.

SUMMARY

Although several different embodiments and modifications of this invention are shown in the previously described figures, it is to be understood that many of the features of each embodiment may be interchanged with those of the other embodiments performing similar or additional functions without departing from the scope of this invention. For example, any one of the damping means disclosed may be used in combination with the brakes shown in FIGS. 6 through 10; and branch lines may be made to the duct means in any of the devices for indicating pressure in the annular piston chambers as well as for operating the brakes.

While there is described above the observed principles of this invention in connection with specific apparatus, it is to be clearly understood that there may be many unobserved side effects which contribute substantially to the efficiency of this device and that this description is made only by way of example and not as a limitation to the scope of this invention.

What is claimed is:

1. In combination with a pair of articulated vehicles, an automatic device (100, 200, 300, 400, 500) for damping quick relative angular movements between two articulated vehicles (2, 30) having a pivotal connection between said vehicles, said device comprising:
   (a) a pivot pin (110, 210, 310) for said connection mounted on one vehicle,
   (b) an arm (120, 130, 220, 320) anchored to said pivot pin for releasable engagement with the other vehicle whereby said pivot pin will turn with said other vehicle relative to said one vehicle,
   (c) piston and cylinder means (170, 270, 370) wherein said piston is articulatively connected eccentrically of and to said pivot pin for converting its rate of angular oscillations into a differential rate of reciprocations of said piston,
   (d) fluid in said cylinder for damping the variable reciprocations of said piston,
   (e) duct means (190, 290, 390) for said fluid from one side of said piston to its other side, and
   (f) a rigidly adjustable continuously open orifice means (191, 291, 391) in said duct means for controlling the damping of the reciprocations of the piston by said fluid.

2. A device according to claim 1 wherein said arm is provided with a vertically offset portion (121, 131, 221, 321) to compensate for vertical angular variations between said vehicles.

3. A device according to claim 1 including a wear resistant bearing for journalling said pivot pin.

4. A device according to claim 1 wherein said cylinder is pivoted (155, 355, 455, 555) to said one vehicle.

5. A device according to claim 1 wherein said duct means (290, 390) is outside said cylinder.

6. A device according to claim 1 wherein said duct means (190) is in said part of said piston.

7. A device according to claim 1 wherein said adjustable orifice means comprises a lockable needle type valve (192, 292, 392).

8. A device according to claim 1 including a cam means (260) mounted on said pivot pin for operating said piston.

9. A device according to claim 1 including a crank means (160, 360) mounted on said pivot pin for operating said piston.

10. An automatic device (100, 200, 300, 400, 500) for damping quick relative angular movements between two articulated vehicles (20, 30) having a pivotal connection between said vehicles, said device comprising:
  (a) a pivot pin (110, 210, 310) for said connection mounted on one vehicle,
  (b) an arm (120, 130, 220, 320) anchored to said pivot pin for releasable engagement with the other vehicle whereby said pivot pin will turn with said other vehicle relative to said one vehicle,
  (c) means (170, 270, 370) anchored to said pivot pin for converting its angular oscillations into variable reciprocations,
  (d) an annular chamber (180, 280, 380) in which the said reciprocating part (175, 275, 375) of said converting means reciprocates,
  (e) fluid in said chamber for damping the variable reciprocations of said converting means,
  (f) duct means (190, 290, 390) for said fluid from one side of said reciprocating part to its other side, said duct means including a branch duct (294, 297, 298) to a pressure responsive switch (405) for controlling a signal means responsive to a predetermined increase in pressure in said chamber, and
  (g) a rigidly adjustable continuously open orifice means (191, 291, 391) in said duct means for controlling the damping of said reciprocating part by said fluid.

11. An automatic device (100, 200, 300, 400, 500) for damping quick relative angular movements between two articulated vehicles (20, 30) having a pivotal connection between said vehicles, said device comprising:
  (a) a pivot pin (110, 210, 310) for said connection mounted on one vehicle,
  (b) an arm (120, 130, 220, 320) anchored to said pivot pin for releasable engagement with the other vehicle whereby said pivot pin will turn with said other vehicle relative to said one vehicle,
  (c) means (170, 270, 370) anchored to said pivot pin for converting its angular oscillations into variable reciprocations,
  (d) an annular chamber (180, 280, 380) in which the said reciprocating part (175, 275, 375) of said converting means reciprocates,
  (e) fluid in said chamber for damping the variable reciprocations of said converting means,
  (f) duct means (190, 290, 390) for said fluid from one side of said reciprocating part to its other side, said duct means including a branch duct (294) having a shuttle valve (295) to transmit the pressure of said fluid from that section of said chamber which is pressurized by said converting means, and
  (g) a rigidly adjustable continuously open orifice means (191, 291, 391) in said duct means for controlling the damping of said reciprocating part by said fluid.

12. A device according to claim 11 including a fluid operated brake cylinder (230, 330, 430, 530) connected to said shuttle valve, and a brake means (225, 325, 425, 525) connected to said pivot pin operated by said cylinder for further restricting the angular movement between said vehicles.

13. A device according to claim 12 wherein said brake means is a drum type brake (325) having brake shoes (331, 332) outside said drum.

14. A device according to claim 12 wherein said brake means is a drum type brake (225, 425) having brake shoes (231, 232; 431, 432) inside said drum.

15. A device according to claim 12 wherein said brake means is a disk type brake (525) having calipers (531) operated by said brake cylinder.

16. A device according to claim 1 wherein said pivotal connection between said two articulated vehicles (20, 30) comprises a slotted fifth wheel (25) on one vehicle and a king pin (110, 210, 310) on the other vehicle.

17. A device according to claim 16 wherein said arm (120, 130) is anchored to said king pin for releasable engagement in the slot (27) of said fifth wheel whereby said king pin will turn with said fifth wheel relative to the vehicle attached thereto.

18. An automatic device (100, 200, 300, 400, 500) for damping quick relative angular movements between two articulated vehicles (20, 30) comprising:
  (a) a pivotal connection between said vehicles comprising a slotted fifth wheel (25) on one vehicle and a king pin (110, 210, 310) on the other vehicle,
  (b) an arm (120, 130, 220, 320) anchored to said king pin for releasable engagement with the one vehicle whereby said king pin will turn with said one vehicle relative to said other vehicle, said arm being provided with a resilient center portion (136) to permit compression thereof for fitting snugly into said slots which vary in width between different vehicles,
  (c) means (170, 270, 370) anchored to said king pin for converting its angular oscillations into variable reciprocations,
  (d) an annular chamber (180, 280, 380) in which the said reciprocating part (175, 275, 375) of said converting means reciprocates,
  (e) fluid in said chamber for damping the variable reciprocations of said converting means,
  (f) duct means (190, 290, 390) for said fluid from one side of said reciprocating part to its other side, and
  (g) a rigidly adjustable continuously open orifice means (191, 291, 391) in said duct means for controlling the damping of said reciprocating part of said fluid.

19. A device according to claim 16 wherein said articulated vehicles comprise a tractor (20) or dolly and trailer (30) combination.

20. In combination with a pair of articulated vehicles, an automatic device (100, 300, 400, 500) for damping quick relative angular movements between said two articulated vehicles (20, 30) having a pivotal connection between said vehicle, said device comprising:
  (a) a pivot pin (110, 210, 310) for said connection mounted on one vehicle,
  (b) an arm (120, 130, 220, 320) anchored to said pivot pin for releasable engagement with the other vehicle whereby said pivot pin will turn with said other vehicle relative to said one vehicle,
  (c) a crank (160, 360) anchored to said pivot pin,
  (d) a piston rod (171, 371) pivotally connected to said crank for converting the rate of angular oscillations into a differential rate of reciprocations,
  (e) a piston head (175, 375) intermediate the ends of said piston rod,
  (f) a cylindrical chamber (180, 380) around said piston head and rod through both ends of which chamber said piston rod extends, and in which chamber said piston head and rod reciprocates, said chamber being pivotally mounted (155, 355, 455, 555) to said other vehicle,
  (g) fluid in said chamber for damping the variable reciprocations of said piston,
  (h) a duct means (190, 390) for conducting said fluid from one side of said piston head to the other side of said piston head, and
  (i) a rigidly adjustable continuously open orifice means (191, 391) in said duct means for controlling the damping of said piston head by said fluid.

21. In combination with a pair of articulated vehicles, an automatic device (200) for damping quick relative angular movements between said two articulated vehicles (20, 30) having a pivotal connection between said vehicles, the device comprising:
  (a) a pivot pin for said connection mounted on one vehicle, (b) an arm (220, 130) anchored to said pivot pin for releasable engagement with the other vehicle whereby said pivot pin will turn with said other vehicle relative to said one vehicle, (c) a cam means (260) anchored to said pivot pin, (d) a reciprocating cam follower (263) cooperating with said cam means for converting the rate of angular oscillations into a differential rate of reciprocations, (e) an annular chamber (280) in which a part (275) of said reciprocating follower reciprocates, (f) fluid in said chamber for damping the variable reciprocations of said part of said follower, (g) a duct means (290) for said fluid from one side of said part of said follower to its other side, and (h) a rigidly adjustable continuously open orifice means (291) in said duct means for controlling the damping of said part of said follower by said fluid.

22. In combination with a pair of articulated vehicles, an automatic device for damping quick relative angular movements between said two articulated vehicles (20, 30) having a slotted fifth wheel (25) and a kingpin (110, 310) connection between said vehicles, the device comprising:

(a) an arm (120, 130, 320) anchored to said kingpin for releasable engagement in the slot (27) of said fifth wheel whereby said kingpin will turn with said fifth wheel relative to the vehicle attached thereto, (b) a crank (160, 360) and piston (170, 370) articulatively connected eccentrically of and to said kingpin for converting the rate of angular oscillations into a differential rate of reciprocations, (c) an annular shaped chamber (180, 380) in which said piston reciprocates, (d) fluid in said chamber for variably damping the reciprocations of said piston, (e) a duct means (190, 390) for said fluid from one side of the head of said piston and the other, and (f) a positively adjustable continuously open orifice means (191, 391) in said duct means for controlling the damping of said piston by said fluid.

23. In combination with a pair of articulated vehicles, an automatic device for damping quick relative angular movements between said two articulated vehicles (20, 30) having a slotted fifth wheel (25) and a kingpin (210) connection between said vehicles, said device comprising:

(a) an arm (220, 130) anchored to said kingpin for releasable engagement in the slot (27) of said fifth wheel whereby said kingpin will turn with said fifth wheel relative to the vehicle attached thereto, (b) cam means (260) anchored to said kingpin, (c) a cam follower (263) cooperating with said cam means for converting the rate of angular oscillations into a differential rate of reciprocations, (d) an annular shaped chamber (280) in which at least a part (275) of the reciprocating part of said follower reciprocates, (e) fluid in said chamber for damping the reciprocations of said reciprocating part of said follower, (f) duct means (290) for said fluid from one side of said reciprocating part of said follower to its other side, and (g) a rigidly adjustable continuously open orifice means (291) in said duct means for controlling the damping of said reciprocating part of said follower by said fluid.

References Cited
UNITED STATES PATENTS

| | | | |
|---|---|---|---|
| 740,473 | 10/1903 | Scherer | 188—93 |
| 1,078,060 | 11/1913 | Newman. | |
| 2,170,898 | 8/1939 | Humphrey | 280—432 |
| 2,188,727 | 1/1940 | Soulis | 280—432 |
| 2,692,146 | 8/1954 | Black | 280—432 |
| 2,726,097 | 12/1955 | Darrough | 280—446 |
| 2,762,634 | 9/1956 | Moseley | 280—432 |
| 3,103,201 | 9/1963 | Owen. | |
| 3,328,051 | 6/1967 | Hope et al. | 280—432 |
| 3,420,548 | 1/1969 | Wakeman | 280—432 |

LEO FRIAGLIA, Primary Examiner

U.S. Cl. X.R.

188—97

PO-1050
(5/69)

UNITED STATES PATENT OFFICE
CERTIFICATE OF CORRECTION

Patent No. 3,515,409                    Dated June 2, 1970

Inventor(s) Eugene W. Hines and Norman F. Lapine

It is certified that error appears in the above-identified patent and that said Letters Patent are hereby corrected as shown below:

Column 1, line 61, "improved" should read -- improving -- ; Column 2, line 59, "drive" should read -- driver -- ; Column 6, line 16, after "242" insert -- 342 -- ; Column 7, line 6, "391" should read -- 381 --; Column 8, line 13, "or" should read -- of --; Column 9, line 18, "396" should read -- 296 --; line 69, "40" should read -- 440 -- ; In Claim 1, column 10, line 33, "2" should read -- 20 -- ; In Claim 18, column 12, line 32, "of" should read -- by --.

SIGNED AND
SEALED
OCT 20 1970

(SEAL)
Attest:

Edward M. Fletcher, Jr.
Attesting Officer

WILLIAM E. SCHUYLER, JR.
Commissioner of Patents